(12) United States Patent
Takeuchi et al.

(10) Patent No.: US 9,197,043 B2
(45) Date of Patent: Nov. 24, 2015

(54) TAPE WINDING STRUCTURE AT WIRE GUIDING OUT PORTION

(71) Applicant: Yazaki Corporation, Tokyo (JP)

(72) Inventors: Kunihiko Takeuchi, Makinohara (JP); Takeshi Onoda, Makinohara (JP)

(73) Assignee: Yazaki Corporation, Tokyo (JP)

(*) Notice: Subject to any disclaimer, the term of this patent is extended or adjusted under 35 U.S.C. 154(b) by 122 days.

(21) Appl. No.: 14/042,962

(22) Filed: Oct. 1, 2013

(65) Prior Publication Data

US 2014/0027148 A1 Jan. 30, 2014

Related U.S. Application Data

(63) Continuation-in-part of application No. PCT/JP2012/002306, filed on Apr. 3, 2012.

(30) Foreign Application Priority Data

Apr. 4, 2011 (JP) .................................. 2011-082653

(51) Int. Cl.
*H02G 3/04* (2006.01)
*B60R 16/023* (2006.01)

(52) U.S. Cl.
CPC .......... *H02G 3/0406* (2013.01); *B60R 16/0238* (2013.01); *B60R 16/0239* (2013.01)

(58) Field of Classification Search
USPC .......................... 174/64, 72 A, 71 R; 138/110
See application file for complete search history.

(56) References Cited

U.S. PATENT DOCUMENTS

| 7,581,564 | B2 * | 9/2009 | Tanaka et al. .................. 138/110 |
| 7,709,736 | B2 * | 5/2010 | Irisawa ........................ 174/71 R |
| 8,188,368 | B2 * | 5/2012 | Suzuki ......................... 174/72 A |
| 2010/0236826 | A1 | 9/2010 | Suzuki |

FOREIGN PATENT DOCUMENTS

| JP | 2006-217778 A | 8/2006 |
| JP | 2007-028806 A | 2/2007 |

OTHER PUBLICATIONS

International Search Report and Written Opinion dated Jul. 11, 2012, issued for PCT/JP2012/002306.

\* cited by examiner

*Primary Examiner* — Dhirubhai R Patel
(74) *Attorney, Agent, or Firm* — Locke Lord LLP

(57) ABSTRACT

A tape winding structure at a wire guiding out portion includes: a gutter-shaped or inverted-gutter-shaped wire guiding wall; and a plate-shaped wire supporting wall opposed to an opening of the wire guiding wall in a wire radial direction, wherein a notch portion for exposing a wire is provided on an end of the wire guiding wall at the opening side, wherein the wire supporting wall is narrower than the wire guiding wall in the wire radial direction at the notch portion, wherein the notch portion is positioned at a corner in a crossing direction between the wire supporting wall and the wire guiding wall, and wherein when a plurality of wires are wound together with the wire guiding wall and the wire supporting wall by a tape, the wire exposed at the notch portion is adhered at a sloped portion of the wound tape.

7 Claims, 4 Drawing Sheets

TAPE WINDING STRUCTURE AT WIRE GUIDING OUT PORTION

TECHNICAL FIELD

This invention relates to a tape winding structure at a wire guiding out portion, for example, a wiring harness is fixed to a wire guiding out portion of an electric junction box with a wound tape.

BACKGROUND ART

Conventionally, various tape winding structures at a wire guiding out portion are suggested for fixing a wiring harness (a plurality of electric wires) to the wire guiding out portion of an electric junction box with a wound tape.

For example, in PLT1 (not shown), it is described that a block to which electric components such as fuse or relay are attached is inserted into a lower case of an electric junction box. The block includes a substantially inverted gutter shaped wire guiding out portion. A wiring harness is fixed to the wire guiding out portion with a wound tape. The wire guiding out portion is guided out of the lower case together with the wiring harness.

Further, in PLT2 (not shown), it is described that a bracket for fixing to a vehicle is attached to a case of an electric junction box. The bracket includes a substantially inverted gutter shaped tongue piece. A wiring harness continued to electric components in the case is fixed to the tongue piece with a wound tape. A lower cover is attached to the case, and the wiring harness is supported by a semi-circular (gutter shaped) tongue piece of the lower cover.

As the tape winding structure at the wire guiding out portion other than the above described, there is a tape winding structure at the wire guiding out portion shown in FIGS. 7 and 8. According to this structure, a lower cover 42 is attached to a frame 41 of an electric junction box. A wiring harness 43 continued to electric components in a not-shown connection block in the frame 41 is guided out along an inverted gutter shaped guiding wall 44 of the frame 41 and along a substantially concave shaped supporting wall 45 of the lower cover 42. A guiding out portion composed of the guiding wall 44 and the supporting wall 45 is wound several times together with the wiring harness 43 by a tape 46. A gap 48 between a lower end of the guiding wall 44 and an upper end of the supporting wall 45 is closed by a winding force of the tape 46, thereby the wiring harness 43 is fully surrounded by the guiding wall 44 and the supporting wall 45.

CITATION LIST

Patent Literature

[PLT1]
JP, A, 2007-28806 (FIGS. 1 to 3)
[PLT2]
JP, A, 2006-217778 (FIGS. 1 and 6)

SUMMARY OF INVENTION

Technical Problem

However, in the conventional tape winding structure at the wire guiding out portion shown in FIGS. 7 and 8, there is a problem that when a pulling force is applied outwardly to the wiring harness, or due to a vehicle shaking, the tape 46 is displaced as shown in FIG. 9, and a gap 49 (a portion surrounded by a circle A) is generated between the tapes, thereby water or the like may enter an inside of the electric junction box via the gap 49. This problem may occur not only in the electric junction box but also a wire guiding out portion of a not-shown harness protector or the like.

In view of the above problem, an object of the present invention is to provide a tape winding structure at a wire guiding out portion configured to allow a tape to be hardly displaced, and to prevent water or the like from entering an inside by preventing a gap between tapes from being generated.

Solution to Problem

For attaining the object, according to the invention claimed in claim 1, there is provided a tape winding structure at a wire guiding out portion comprising:

a gutter-shaped or inverted-gutter-shaped wire guiding wall; and a plate-shaped wire supporting wall opposed to an opening of the wire guiding wall in a wire radial direction, wherein a notch portion for exposing a wire is provided on an end of the wire guiding wall at the opening side, wherein the wire supporting wall is narrower than the wire guiding well in the wire radial direction at the notch portion, wherein the notch portion is positioned at a corner in a crossing direction between the wire supporting wall and the wire guiding well, and wherein when a plurality of wires are wound together with the wire guiding wall and the wire supporting wall by a tape, the wire exposed at the notch portion is adhered at a sloped portion of the wound tape.

According to the above structure, when the wire exposed at the notch portion is wound by a tape, a contact area of the wire with respect to the tape is increased, thereby the tape is prevented from being displaced. Further, the wire exposed at the notch portion is adhered at the sloped portion of the wound tape. The sloped portion of the wound tape is adhered, continued to the wire supporting wall adjacent upward or downward to the sloped portion, and continued to the wire guiding wall adjacent upward or downward to the sloped portion. Further, the sloped portion of the wound tape pushes the wire inward in the wire radial direction. Therefore, the wire exposed at the notch portion is firmly fixed, and the tape is surely prevented from being displaced when the wire is pulled or a vehicle is shaken. Preferably, the sloped portion of the wound tape is bent in a substantially dogleg shape along an outer peripheral wall of the wire (the wire is projected further outward in the wire radial direction than the sloped portion). The wire guiding wall and the wire supporting wall can be used in an electric junction box, a harness protector, or the like.

According to the invention claimed in claim 2, there is provided the tape winding structure at a wire guiding out portion as claimed in claim 1, wherein the notch portion is notched from an open end of the wire guiding wall in a wire longitudinal direction.

According to the above structure, an one-turn tape wound at the open end of the wire guiding wall in the wire longitudinal direction is, for example, adhered to the wire in an inside of the notch portion and to a projecting portion outward from the open end in the wire longitudinal direction simultaneously to fix the wire firmly, thereby the tape is surely prevented from being displaced.

According to the invention claimed in claim 3, there is provided the tape winding structure at a wire guiding out portion as claimed in claim 1 or 2, wherein the notch portions are provided on both sides in a width direction of the wire guiding wall opposed to each other.

According to the above structure, the contact area of the wire with respect to the tape is further increased. Further, the tape pushes the plurality of wires inwardly in the wire radial direction at the sloped portions in the two notch portions in a circumferential direction of the wire, and adheres firmly to an outer peripheral wall of the wire. Thereby, the tape is further surely prevented from being displaced.

According to the invention claimed in claim 4, there is provided the tape winding structure at a wire guiding out portion as claimed in any one of claims 1 to 3, wherein the wire supporting portion is flexible in a thickness direction.

According to the above structure, the wire supporting wall is bent inwardly by a winding force of the tape, and closely abutted on an outer peripheral wall of the wire without gap. Further, the wire is pushed to be abutted on an inner wall of the wire guiding wall. Thereby, contact friction between the wire supporting wall and the wire and contact friction between the wire guiding wall and the wire prevent a movement of the wire in the wire longitudinal direction, and the tape is further surely prevented from being displaced.

Advantageous Effects of Invention

According to the invention claimed in claim 1, when the wire exposed at the notch portion is wound by a tape, the contact area of the wire with respect to the tape is increased to prevent the tape from being displaced. Further, the wire exposed at the notch portion is adhered at the sloped portion of the wound tape, and the sloped portion of the wound tape is adhered continued to the wire supporting wall adjacent to one, and continued to the wire guiding wall adhered to the other. Further, the sloped portion of the wound tape pushes the wire inward in the wire radial direction. Thereby, the wire exposed at the notch portion is firmly fixed, and the tape is surely prevented from being displaced when the wire is pulled or a vehicle is shaken. Thereby, a gap between the tapes is prevented from being generated, and the water or the like is prevented from entering the wire guiding wall (for example, electric junction box).

According to the invention claimed in claim 2, an one-turn tape wound at the open end of the wire guiding wall in the wire longitudinal direction is, for example, adhered to the wire in an inside of the notch portion and to a projecting portion outward from the open end in the wire longitudinal direction simultaneously to fix the wire firmly, thereby the tape is surely prevented from being displaced.

According to the invention claimed in claim 3, the contact area of the wire with respect to the tape is further increased. Further, the tape pushes the plurality of wires inwardly in the wire radial direction at the sloped portions in the two notch portions in a circumferential direction of the wire, and adheres firmly to an outer peripheral wall of the wire. Thereby, the tape is further surely prevented from being displaced.

According to the invention claimed in claim 4, the wire supporting wall is bent by a winding force of the tape, and closely abutted on an outer peripheral wall of the wire. Further, the wire is pushed to be abutted on an inner wall of the wire guiding wall. Thereby, contact friction between the wire supporting wall and the wire and contact friction between the wire guiding wall and the wire prevent a movement of the wire in the wire longitudinal direction, and the tape is further surely prevented from being displaced.

DESCRIPTION OF EMBODIMENTS

FIGS. 1 to 5 show an embodiment of a tape winding structure at a wire guiding out portion according to the present invention.

Figure 1:
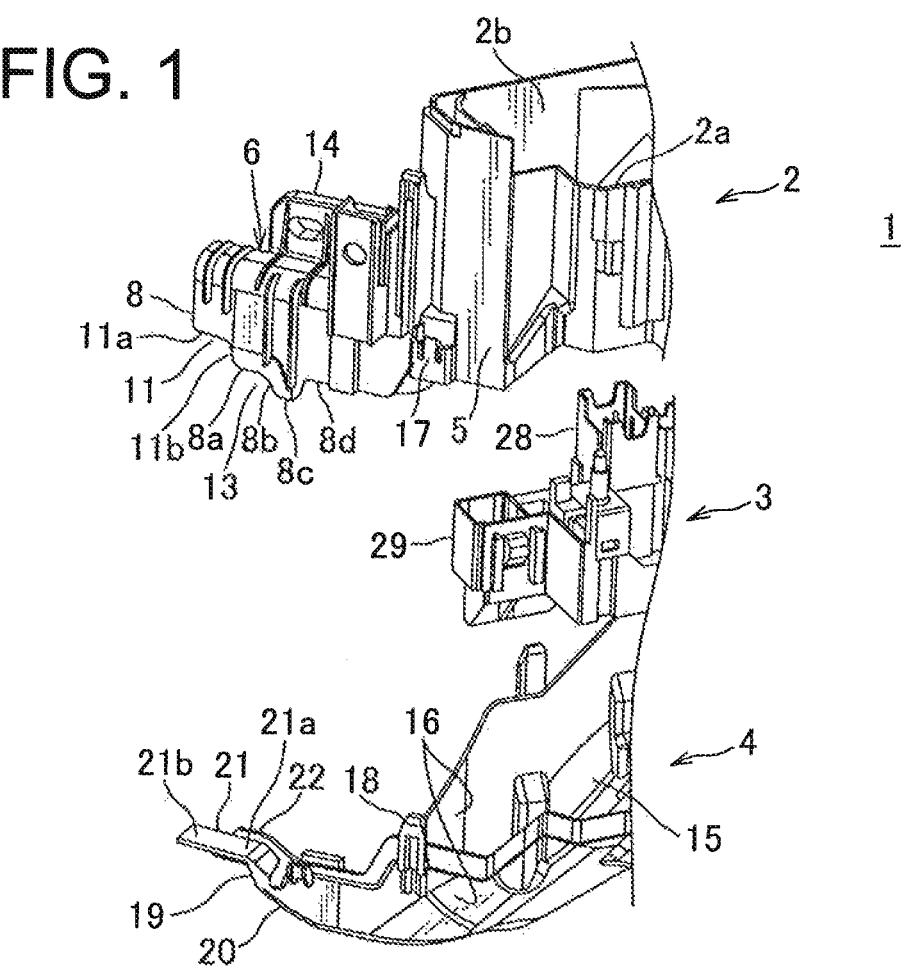
FIG. 1 is a partially exploded perspective view showing an embodiment of an electric junction box having a tape winding structure at a wire guiding out portion according to the present invention.

As shown in FIG. 1, this tape winding structure at a wire guiding out portion is, for example, used in an electric junction box 1 such as a fuse block. The electric junction box 1 includes: a synthetic-resin-made frame 2; an insulating-resin-made connection block 3 inserted into the frame 2 from a lower side of the frame 2; a synthetic-resin-made lower cover 4 attached to a lower side of the frame 2 to close a lower opening; and a not-shown synthetic-resin-made upper cover attached to an upper side of the frame 2 to close an upper opening.

The frame 2 includes: a vertical peripheral wall 5 having an internal space (block receiving space) 2b passing through up and down; and an inverted gutter shaped (inverted U-shaped vertical section) wire guiding wall 6 projected forward substantially horizontally and integrally from the peripheral wall 5.

Figure 2:
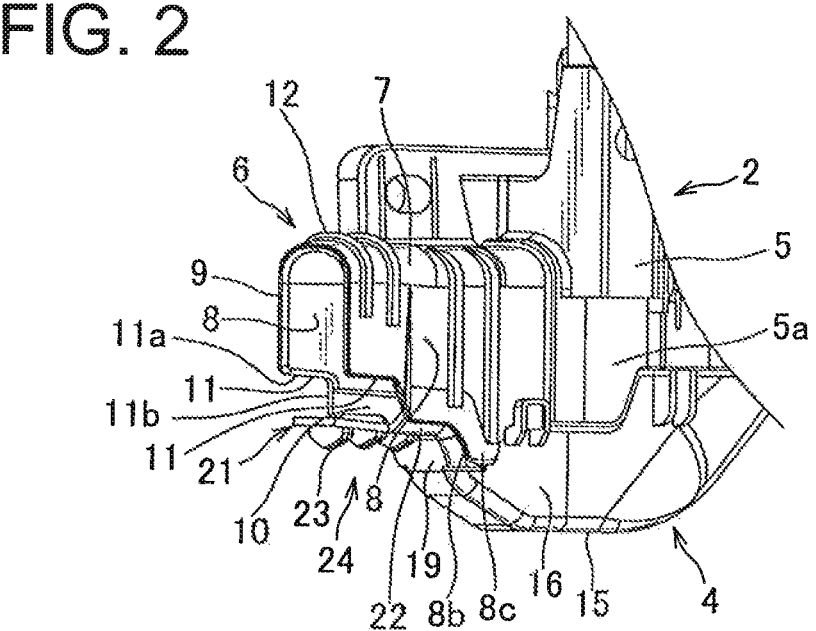
FIG. 2 is a perspective view of an assembled wire guiding out portion of the same electric junction box.

As shown in FIG. 2, the wire guiding wall 6 is composed of an upper curved wall 7 and left and right vertical sidewalls 8. The sidewall 8 has a notch portion 11 for exposing a wire made by notching a lower end, namely, an end at an opening 10 side in a wire radial direction of the sidewall 8 at a projecting tip side, namely, an open end 9 side in a wire longitudinal direction of the wire guiding wall 6. A plurality of ribs 12 for preventing a tape from slipping are provided on an outer peripheral wall of the curved wall 7 and an upper half of the sidewall 8 above the notch portion 11.

As shown in FIGS. 1 and 2, the notch portion 11 includes: a horizontal upper side portion 11a; and a vertical or slightly sloped rear side portion 11b crossing the upper side portion 11a. The upper side portion 11a is continued perpendicular to a tip (front end) 9 of the wire guiding wall 6. The rear side portion 11b is continued to a horizontal short lower side portion 8a (FIG. 1) of the sidewall 8. The lower side portion 8a is continued to a lower sloped side portion 8b. The sloped side portion 8b is continued to a rear downward-facing convex wall 8c. The convex wall 8c is continued to a rear long lower side portion 8d. The short lower side portion 8a and the sloped side portion 8b compose a lower and rear step portion 13 for engaging with the lower cover 4.

A bracket 14 for fixing the frame 2 to a vehicle body is provided on a base end of the wire guiding wall 6. A space (wire insertion space) in the wire guiding wall 6 is communicated with a space 2b in the peripheral wall 5 via a not-shown substantially inverted U shaped opening of the peripheral wall 5. Incidentally, in this specification, directional property such as front, rear, left, and right is denoted as a matter of convenience for explanation, and does not necessarily correspond to an attaching direction of the electric junction box.

As shown in FIG. 1, the lower cover 4 includes: a bottom wall 15; and left and right sidewalls 16 vertically extended from the bottom wall 15. A locking frame piece (receiving portion) 18 with respect to a locking piece (locking portion) 17 of the frame 2 as a locking member is provided on the sidewall 16. The bottom wall 15 is extended obliquely at a front side of the bottom wall to form a sloped bottom wall 19 (FIG. 2). An upper side of the sidewall 16 at one side of the sloped bottom wall 19 is notched in a concave shape (the concaved portion is denoted by reference sign 20). A rectangular plate shaped wire supporting wall 21 is projected forward (outward) substantially horizontally from an upper end of the sloped bottom wall 19.

A rear half portion 21a of the wire supporting wall 21 has low-profile sloped rib-shaped sidewalls 22 at left and right sides. A front half portion 21b of the wire supporting wall 21 is formed in a plate shape without rib. The wire supporting wall 21 includes a plurality of ribs 23 (FIG. 2) for preventing a tape from slipping. The front half portion 21b of the wire supporting wall 21 is flexible in a thickness direction (vertical direction).

As shown in FIG. 2, an upper end of the sidewall 16 of the lower cover 4 is joined to a lower end of a sidewall 5a of the frame 2. The sloped bottom wall 19 is joined to the sloped side portion 8b of a rear half of the wire guiding wall 6. The convex wall 8c is joined to the concave portion 20 (FIG. 1) at a rear side of the sloped bottom wall 19. The short horizontal bottom side portion 8a is joined to the low-profile sloped rib-shaped sidewall 22 of a rear half portion 6a of the wire guiding wall 6. The front half portion 21b of the wire supporting wall 21 is positioned at a lower side of the notch portion 11. A wire guiding out portion 24 is composed of the wire guiding wall 6 and the wire supporting wall 21. When the rear half portion 6a of the wire guiding wall 6 and the sloped bottom wall 19 are abutted on and engaged with the step portion 13 (FIG. 1) at a lower side of the wire guiding wall 6, the wire guiding wall 6 is prevented from being shaken and displaced.

Figure 3:
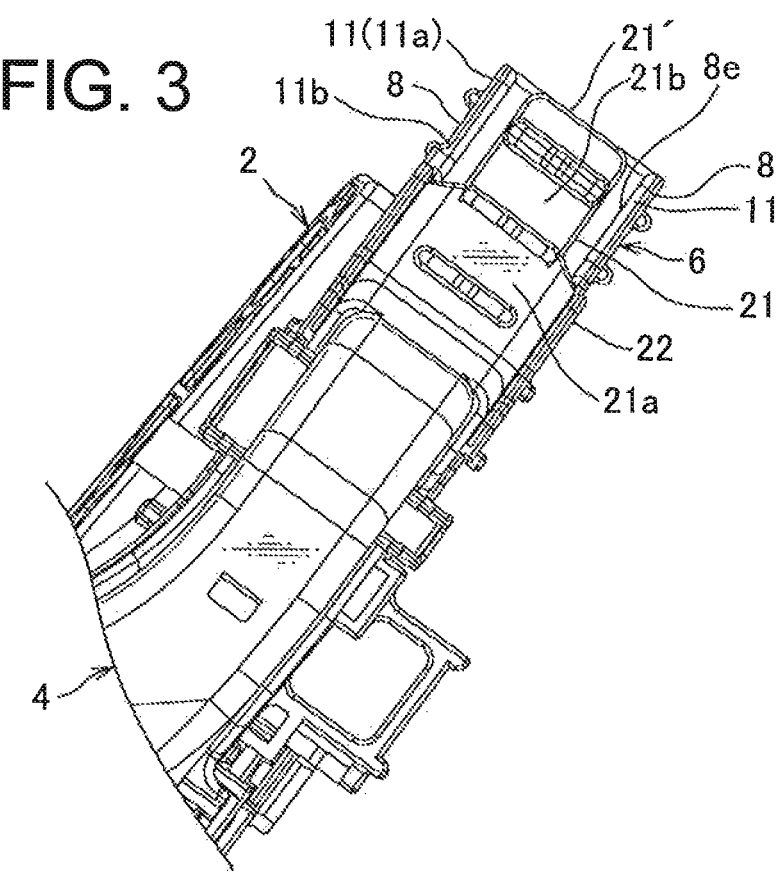
FIG. 3 is a bottom view of the wire guiding out portion of the same electric junction box.

As shown in FIG. 3 (bottom view), the front half portion 21b of the wire supporting wall 21 is formed narrower than an outer width and an inner width (inner wall is denoted by reference sign 8e) of the left and right sidewalls 8 of the wire guiding wall 6. The upper side portions 11a of the notch portions 11 at the left and right sidewalls 8 are positioned at an outer upper side of the left and right ends of the front half portion 21b of the wire supporting wall 21. The rear side portion 11b of the notch portion 11 is positioned at an upper side of a front end of a rear half portion 21a of the wire supporting wall 21.

A virtual line or a virtual plane connecting the left and right ends of the front half portion 21b of the wire supporting wall 21 and the upper side portion 11a of the notch portion 11 is in a taper shape gradually narrower as it extends downward (gradually wider as it extends upward). This configuration will be explained with reference to FIG. 6. A tip (front end) 21 of the wire supporting wall 21 is positioned on the same vertical plane as the tip (front end) 9 (FIG. 1) of the wire guiding wall 6. In FIG. 3, reference sign 22 denotes a sloped rib-shaped sidewall of the rear half portion 21a.

As shown in FIG. 1, the connection block 3 includes: a fusible link attaching portion 28; a connector attaching portion 29; a not-shown relay attaching portion; a fuse attaching portion; and the like. Electric wires connected to these not-shown electric components such as fusible link, relay, and fuse and an electric wire guided out of a connector as a wiring harness 25 (FIG. 4) are guided out downward, and guided out from the wire guiding portion 24 while protected by the lower cover 4.

Figure 4:
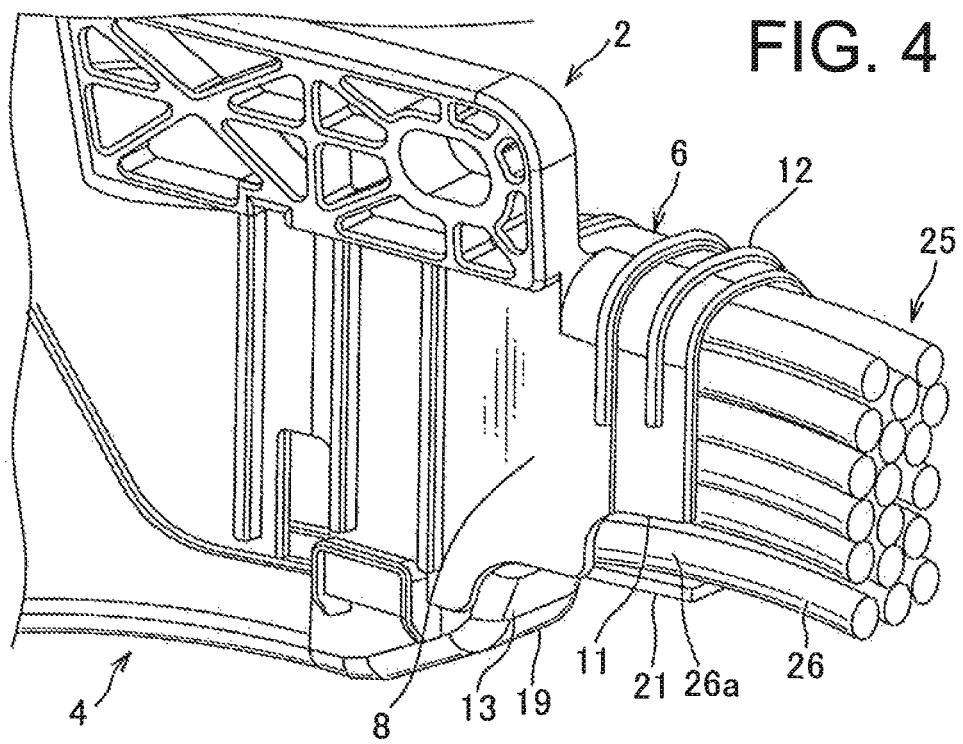
FIG. 4 is a perspective view showing a plurality of electric wires (wiring harness) inserted into the wire guiding out portion.

As shown in FIG. 4, while the lower cover 4 is attached to the frame 2, a part 26a of wires 26 of the wiring harness 25 is exposed at the notch portion 11 of the wire guiding wall 6 of the frame 2. The notch portion 11 is notched long in a wire longitudinal direction (oblong rectangular shape). The wire supporting wall 21 narrower than an outer diameter in a horizontal direction of the wiring harness 25 is positioned at a lower side of the wiring harness 25. A lower end face of the wiring harness 25 is supported stably on an upper face of the wire supporting wall 21.

The wiring harness 25 is shown short as a matter of convenience, and in practice, is extended long and connected to electric components (load side) or the like in a not-shown vehicle. In this embodiment, one wire 26 is exposed at the notch portion 11. The number of exposed wires can be properly changed by setting properly a height of the notch portion 11 corresponding to a diameter of the wire 26.

Figure 5:
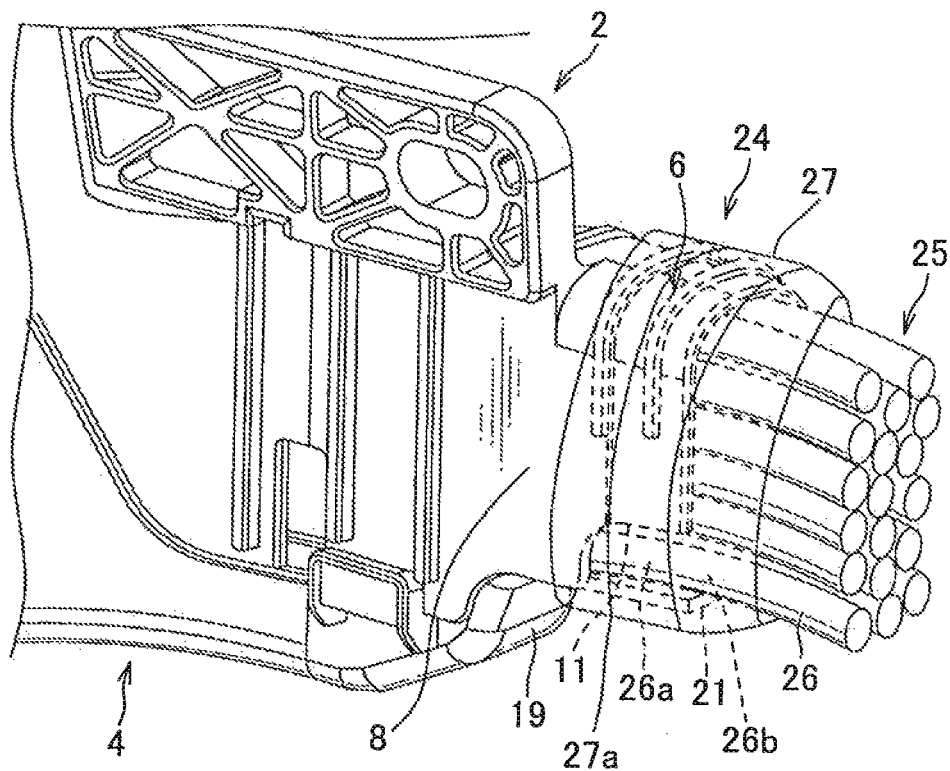
FIG. 5 is a perspective view showing the tape winding structure at a wire guiding out portion.

As shown in FIG. 5, a synthetic-resin-made one-side adhesive tape 27 is wound a plurality of times in a row around an outer peripheral wall of the wire guiding out portion 24 composed of the wire guiding wall 6 and the wire supporting wall 21, and an outer peripheral wall of the wiring harness 25 so that the wiring harness 25 is fixed to the wire guiding out portion 24, and the gap between the wire guiding out portion 24 and the wiring harness 25 is eliminated to make it watertight.

An outer peripheral wall of the part 26a of the wire 26 exposed at the notch portion 11 is directly adhered and fixed with the tape 27. The front half portion 21b of the wire supporting wall 21 is bent upward by the winding force of the tape 27, and closely abutted on a lower face of the wiring harness 25. A winding direction of the tape 27 may start from the wire guiding wall 6 side and stop to the wiring harness 25 side or vice versa.

Figure 6:
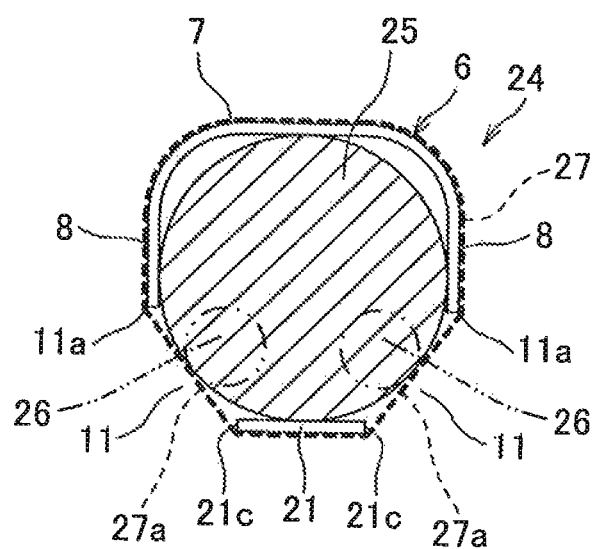
FIG. 6 is a vertical sectional view showing the tape winding structure at a wire guiding out portion.

As shown in FIG. 6, because the wire supporting wall 21 is narrower than the wire guiding wall 6, the tape 27 is wound obliquely upward from left and right ends 21c of the wire supporting wall 21 to a lower end (upper side portion 11a of the notch portion 11) of the sidewalls 8 of the wire guiding wall 6 (sloped portion of the wound tape 27 is denoted by reference sign 27a). Preferably, the sloped portion 27a of the tape 27 is bent in substantially a dogleg shape along an outer peripheral wall of the wire 26 exposed at the notch portion 11 (the wire 26 is projected outward in a wire radial direction from the sloped portion 27a so that the sloped portion 27a is projected outward in substantially a dogleg shape). The sloped portion 27a of the wound tape 27 is closely abutted on (adhered on) an outer peripheral wall of the wire 26 with a pushing force inward in the wire radial direction.

The wire supporting wall 21 is bent upward with the winding force of the wound tape 27 and closely abutted on a lower face of the wiring harness 25 to push an upper wall of the wiring harness 25 to an inner face of the curved wall 7 at an upper side of the wire guiding wall 6. The wires 26 exposed at the notch portions 11 disposed at left and right corners at a lower side of the wire guiding out portion 24, namely, corners crossing the wire guiding wall 6 and wire supporting wall 21 are directly adhered at the sloped portions 27a of the wound tape 27.

An area of the wiring harness 25 contacting the tape 27 is increased in comparison to a case that the notch portion 11 is not provided (conventional way), and the tape is prevented from being displaced. Thereby, a gap between the tapes is prevented from being generated, and the water or the dust is prevented from entering the electric junction box via the gap.

Incidentally, in the above embodiment, the notch portion 11 is disposed at a lower side of the wire guiding out portion 24 for improving waterproof performance with respect to cleaning water from above when, for example, the electric junction box 1 is disposed on an engine room of a vehicle. However, when the electric junction box is disposed a place where no cleaning water is applied, it is possible that substantially a gutter shaped (U-shaped) wire guiding wall 6 is provided on the lower cover 4, the notch portions 11 are provided on an upper side of the left and right sidewalls 8, a plate-shaped upper wire supporting wall 21 narrower than the wire guiding wall 6 is provided on the frame 2, and the notch portion 11 is arranged at an upper side of the wire guiding out portion 24.

Further, in the above embodiment, the notch portions 11 are provided on left and right sides of the wire guiding wall 6. However, the notch portion 11 may be solely provided on any one of the left and right sides. In this case, for example in FIG. 6, a horizontal distance from the center of the wiring harness 25 to a left end (left sidewall 8) of the wire guiding wall 6, or to a right end (right sidewall 8) is long at the side where the notch portion 11 is not provided, and short at the side where the notch portion 11 is provided. This case is similar when the wire guiding wall 6 and the wire supporting wall 21 are inverted upside down.

Further, in the above embodiment, the frame 2 and the lower cover 4 are separately provided, and the wire guiding wall 6 and the wire supporting wall 21 are separately formed. However, for example, in a case that the wire guiding wall 6 and the wire supporting wall 21 are integrally provided up and down in a junction box main body or a case in which the frame 2 and the lower cover 4 are integrally provided, the tape 27 can directly adhere to the wire 26 at the notch portion 11 of the wire guiding wall 6.

Figure 7:
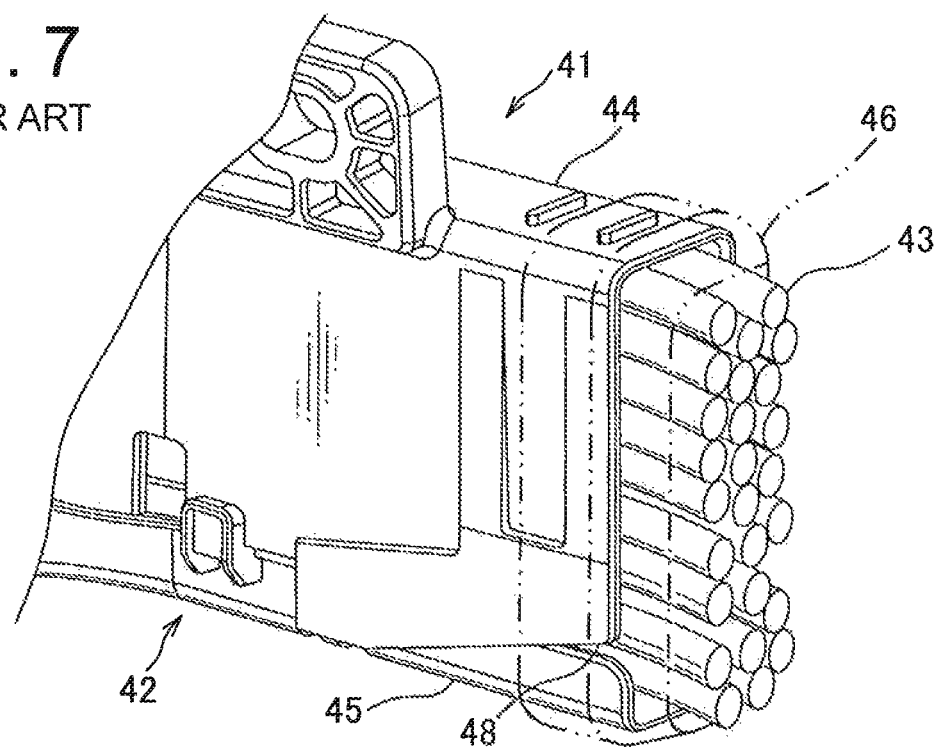
FIG. 7 is a perspective view showing a conventional tape winding structure at a wire guiding out portion.
Figure 8:
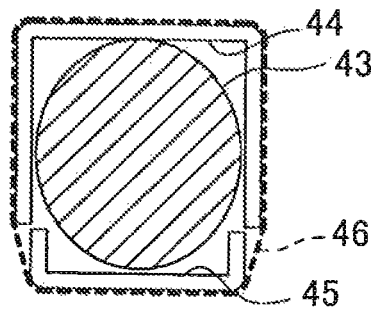
FIG. 8 is a vertical sectional view showing the same conventional tape winding structure at a wire guiding out portion.
Figure 9:
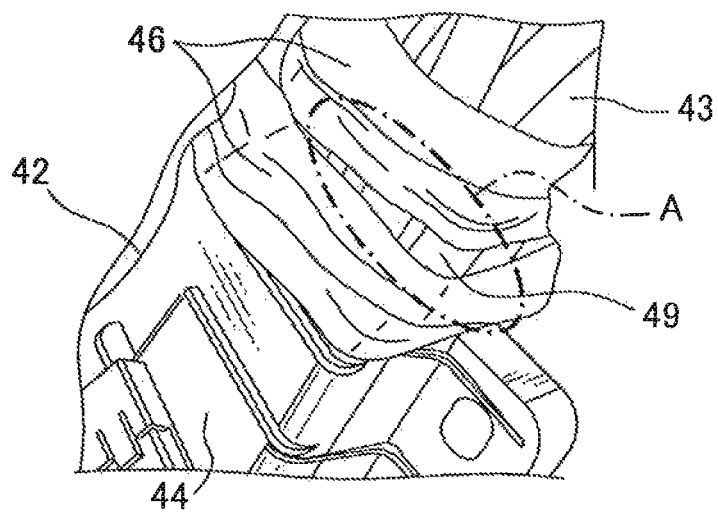
FIG. 9 is a perspective view showing a problem of the conventional tape winding structure at a wire guiding out portion.

Further, in the above embodiment, the notch portion 11 for exposing the wire 26 is notched from a projecting tip (front end) 9 of the wire guiding wall 6 in the wire longitudinal direction (backward). However, if the wire supporting wall 21 is formed narrower than the wire guiding wall 6, the notch portion 11 can be disposed in the middle of the wire guiding wall 6 in the wire longitudinal direction. Further, a shape of the wire guiding wall 6 may be a gutter shape of which upper wall is not curved and plate-shaped similar to the conventional example (FIG. 7).

Further, in the above embodiment, an example in which the wire guiding wall 6 and the wire supporting wall 21 are provided on the electric junction box main body (the frame 2 and the lower cover 4) is explained. However, the tape winding structure at a wire guiding out portion of the present invention is not only used in the electric junction box 1, for example, but also used in a not-shown synthetic-resin-made harness protector for inserting and protecting a wiring harness.

In this case, the harness protector is, for example, composed of a lower gutter-shaped protector main body and an upper cover having an inverted U sectional shape (second protector main body) which are fixed to each other with a locking member (a locking portion and a receiving portion). The gutter-shaped (U-shaped) wire guiding wall 6 is integrally provided on an end of the protector main body. The notch portion 11 for exposing the wire 26 is provided on the wire guiding wall 6. The plate-shaped wire supporting wall 21 is integrally provided on the cover. The electric junction box main body and the protector main body can be generically referred to as a hollow structure.

INDUSTRIAL APPLICABILITY

The tape winding structure at a wire guiding out portion according to the present invention can be used for preventing water or the like from entering an electric junction box by preventing a tape for fixing wiring harness from being displaced and by preventing a gap between the tapes from being generated at a wire guiding out portion of the electric junction box mounted on, for example, a vehicle.

REFERENCE SIGNS LIST

6 wire guiding wall
9 open end
10 opening
11 notch portion
21 wire supporting wall
25 wiring harness (a plurality of wires)
26 wire
27 wound tape
27a sloped portion

The invention claimed is:
1. A junction box comprising:
a tape winding structure at a wire guiding out portion of the junction box, the tape winding structure including:
  a gutter-shaped or inverted-gutter-shaped wire guiding wall; and
  a plate-shaped wire supporting wall opposed to an opening of the wire guiding wall in a first wire radial direction,
  wherein a notch portion for exposing a wire is provided on an end of the wire guiding wall at the opening side,
  wherein the wire supporting wall is narrower than the wire guiding wall in a second wire radial direction perpendicular to the first wire radial direction at the notch portion,
  wherein the notch portion is positioned at a corner in a crossing direction between the wire supporting wall and the wire guiding wall, and
  wherein when a plurality of wires are wound together with the wire guiding wall and the wire supporting wall by a tape, the wire exposed at the notch portion is adhered at a sloped portion of the wound tape.
2. The junction box as claimed in claim 1,
wherein the notch portion is notched from an open end of the wire guiding wall in a wire longitudinal direction.
3. The junction box as claimed in claim 2,
wherein the notch portions are provided on both sides in a width direction of the wire guiding wall opposed to each other.
4. The junction box as claimed in claim 2,
wherein the wire supporting portion is flexible in a thickness direction.

5. The junction box as claimed in claim 1,
wherein the notch portions are provided on both sides in a width direction of the wire guiding wall opposed to each other.

6. The junction box as claimed in claim 5,
wherein the wire supporting portion is flexible in a thickness direction.

7. The junction box as claimed in claim 1,
wherein the wire supporting portion is flexible in a thickness direction.

* * * * *